Figure 1:
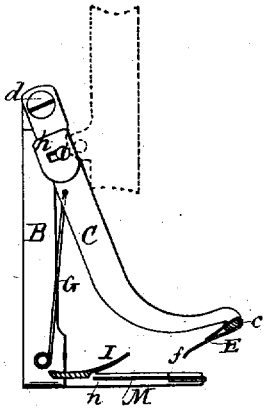

F. B. ZAY,

Assignor, by mesne assignments, to JOHNSTON RUFFLER CO.

Ruffling Attachment for Sewing Machines.

No. 9,722. Reissued May 24, 1881.

*Witnesses:*
C. J. Hedrick
Philip Mauro

*Inventor:*
Frederic B. Zay by
A. Blok
his attorney.

N. PETERS, Photo-Lithographer, Washington, D. C.

UNITED STATES PATENT OFFICE.

FREDERIC B. ZAY, OF FINDLAY, OHIO, ASSIGNOR, BY MESNE ASSIGNMENTS, TO JOHNSTON RUFFLER COMPANY, OF OTTUMWA, IOWA.

RUFFLING ATTACHMENT FOR SEWING-MACHINES.

SPECIFICATION forming part of Reissued Letters Patent No. 9,722, dated May 24, 1881.

Original No. 112,882, dated March 21, 1871. Application for reissue filed November 8, 1880.

*To all whom it may concern:*

Be it known that I, FREDERIC B. ZAY, of Findlay, Ohio, have invented a certain new and useful Improvement in Ruffling Attachments for Sewing-Machines, of which improvement the following specification is a full description.

This invention relates to sewing-machine attachments, in which a piece of cloth is, by means of a reciprocating gatherer or gathering-blade operating from a suitable moving part of the machine, ruffled or gathered in folds, which are then sewed by the stitch-forming mechanism of the machine. It has, however, more particular reference to that class of attachments which are adapted to be secured to the cloth or bed plate of the machine, and in which the gatherer is operated from the needle-bar by means of a pivoted arm or lever.

The invention consists, first, in the combination, with a gatherer or gathering-blade, of a separator against which the gatherer acts to form the ruffle, and a presser-foot forming a part of the attachment, which presser-foot is arranged on the other side of the gatherer from the separator, and in operation is placed under the usual presser-foot of the machine, so that the end of the gatherer works between the separator and presser-foot of the attachment; secondly, in the arrangement of the gatherer and separator, so that in operation the former carries the material to be gathered far enough for the needle to catch the fold, but not quite to the end of the separator; thirdly, in the combination of a supporting-frame, an arm or lever pivoted to said frame, so as to be above the bed-plate of the sewing-machine when the attachment is secured thereon, a gatherer or gathering-blade operated by means of said lever, and a flexible separator, against which the gatherer acts, attached to and carried by said frame; fourthly, in the combination, with a gatherer and separator, against which said gatherer acts, of a presser-foot, recessed or cut away on its under side, and arranged so that the gatherer works between it and the presser-foot; and, fifthly, in the combination, with the gatherer of a ruffling attachment, of a presser-foot and separator arranged to extend under said foot, and a frame connecting said foot and separator with each other.

The invention also comprises other combinations of elements and the particular construction of certain parts, as hereinafter more fully set forth.

The improved attachment is mainly designed for forming a uniform ruffle and enabling it to be sewed between two straight pieces of cloth at one operation; but it can also be used in forming a ruffle, to be sewed at the same operation to one straight piece of cloth, or for forming simply an even and uniform ruffle. The separator on which the end of the gatherer rests has two functions. Primarily, it separates the piece which is ruffled from a straight piece to which the ruffle is to be united; but, irrespective of such operation, it, being smooth and flexible, furnishes a better bearing for the gatherer. The presser-foot of the attachment, in connection with the separator, between which and itself the end of the gatherer moves, aids in securing evenness and uniformity in the ruffle, the effect of stroking the gathers being produced in operation. By the use of a lever pivoted to the frame of the attachment, and thus constituting a part of said attachment, and having the gatherer attached to a projection from its side, great simplicity and compactness are obtained, and the parts are not liable to get out of order.

In order that the invention and the manner of carrying the same into effect may be fully understood it will now be described in connection with the accompanying drawings, which form a part of this specification.

Figure 2:
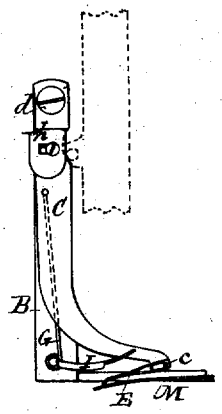
Figure 3:
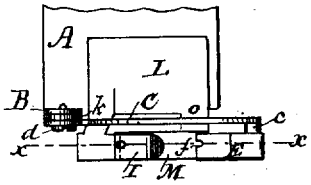
Figure 4:
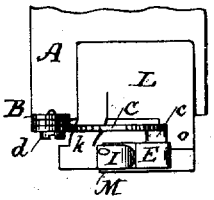

Figure 1 is a view of a ruffling attachment embodying the invention, the upper part of the attachment being shown in side elevation, and the lower portion in vertical section through line *x x*, Fig. 3; Fig. 2, a view in side elevation of the attachment in position for forming a fold in the material to be ruffled; Fig. 3, a plan view of the attachment in the position shown in Fig. 1, a portion of the bed-plate being removed; and Fig. 4 a similar view with reference to Fig. 2. In Figs. 1 and 2 the position of the needle-bar of the sewing-machine is shown in dotted lines.

The frame of the attachment is composed of a bed-plate, A, adapted to be secured to the bed-plate of the sewing-machine, and an upright arm, B, to which the arm or lever C, for operating the gatherer, is pivoted and secured by the screw-bolt *d*, so as to be capable of vibration.

The gatherer E, made of elastic steel and provided with a slot, *f*, at its outer or free end, as usual, is secured to a wrist or projection, *c*, extending from the side of the pivoted arm or lever C, and is reciprocated from the needle-bar of the machine through the medium of said arm or lever. For more convenient securing of the gatherer, the wrist or projection *c* is wedge-shaped in cross-section. The operation or vibration of the lever C is, as represented, effected in one direction by the needle-bar in its descent, and in the other by the spring G, which is secured to the arm B of the ruffler-frame, and acts to move the lever C on the ascent of the needle-bar. The curved shape, as shown, of the pivoted arm or lever is designed to bring the gatherer into proper position relative to the stitch mechanism of the sewing-machine, and to the other parts of the attachment.

In order to regulate the stroke of the pivoted arm or lever an adjustable slide, *h*, is fastened thereto in such position as to limit its backward movement by contact with the projection on the needle-bar at the top of the stroke of the latter. Near the upper part of the arm C, adjacent to the slide *h*, is a notch or recess, as shown partly in dotted lines.

The separator M consists of an elastic steel plate, secured to the bed-plate A by means of an elastic projection, *o*, and extends from said projection *o* in the same direction as the gatherer extends from the wrist *c*. It extends beyond the point to which the folds or gathers are carried by the gatherer. At its outer or free end it is provided with a slot, *n*. The end or point of the gatherer is curved slightly downward, to more surely catch the cloth so as to fold the same, and it acts against the surface of the separator. Both the gatherer and separator, being elastic, adapt themselves to different thicknesses of cloth, and are not quickly worn. This action of the elasticity or flexibility in preventing wear is particularly important in the case of the separator, as it prevents it from being scratched or made rough by the feed-surface.

The presser-foot I of the attachment is provided with a hole for the passage of the needle, and is carried by the bed-plate, through the medium of an elastic projection, *k*. It is recessed or cut away on the under side, as shown, so as to leave a space above and slightly beyond the end of the separator for the more free passage of the material, and both it and the separator are raised somewhat above the under surface of the bed-plate A, and, consequently, when the attachment is placed in position in the machine, are raised above the bed-plate of the latter. The elastic projections *k o* are readily formed from a plate, L, of suitable material, shaped as shown, and fastened to the bed-plate of the attachment.

In order to make it more convenient to put the cloth at the start under the presser-foot I the elastic projection can be formed so as to lift it whenever it is relieved of pressure.

In using the attachment it is placed on the bed-plate of the sewing-machine, with the presser-foot of the attachment under the presser-foot of the machine, so that the needle-holes are in line, and is secured firmly in position by a thumb-screw. When the needle descends the needle, screw, or other projection on the needle-bar strikes the pivoted arm or lever C and presses the gatherer E forward far enough for the needle to catch a fold formed by it, but not quite to the end of the separator or flexible plate M.

To form simply a ruffle, pass the cloth between the separator M and the gatherer E. The latter at each forward motion forms a fold, which is forced by the gatherer between the separator and the auxiliary presser-foot I, and held until the needle passes through it and it is secured by the stitch. This being done while the feed is at rest, or, rather, out of action, the fold is not disarranged.

To form the ruffle and sew it to one piece, pass the piece that is to be left straight beneath the separator M, and the piece to be ruffled between the separator M and the gatherer E.

To form the ruffle and sew it between two pieces, pass one piece to be left straight beneath the separator M, the piece to be ruffled between the separator M and the gatherer E, and the other to be left straight over the gatherer E, between it and the presser-foot I.

The attachment may be applied to any machine by varying the length of the arms B and C and the size of the hole for the thumb-screw.

Having now fully described the said invention and the manner of carrying the same into effect, what I claim is—

1. In a ruffling attachment for sewing-machines, the combination, with a gatherer or gathering-blade, of a separator, against which the gatherer acts to form the ruffle, and a presser-foot, forming a part of the attachment, arranged, as indicated, so that the gatherer works between it and the separator, and adapted to be placed under the presser-foot of the sewing-machine, substantially as described.

2. In combination with the gatherer of a ruffling attachment, a separator, against which the gatherer acts, arranged, as indicated, so that the gatherer carries the material to be ruffled or gathered far enough for the needle to catch the fold, but not quite to the end of the separator, substantially as described.

3. The combination, in a ruffling attachment, of a frame, an arm or lever pivoted to said frame so as to be above the bed-plate of the machine, a gatherer operated by means of said lever, and a flexible separator, against which said gatherer acts, attached to and carried by aforesaid frame, substantially as described.

4. The combination, with a gatherer and separator, against which said gatherer acts, of a presser-foot, recessed or cut away on its under side and arranged, as indicated, so that the gatherer works between it and the presser-foot, substantially as described.

5. The combination, with the gatherer of a ruffling attachment, of a presser-foot, a separator arranged to extend under said foot, and a frame connecting said foot and separator with each other, substantially as described.

6. In combination with the gatherer of a ruffling attachment, a plain flat flexible plate carried by the frame of the attachment, through the medium of a projection, and arranged to form a bearing-surface for the end of the gatherer, substantially as described.

7. In a ruffling attachment, the combination of a frame, an arm or lever pivoted to said frame, a gatherer operated from the needle-bar through said lever, and a separator, against which said gatherer acts, secured to said frame, substantially as described.

8. The frame of a ruffling attachment, comprising a bed-plate and upright arm, in combination with a separator carried by a projection from said bed-plate, a lever pivoted to said upright arm, and a gatherer attached to a wrist or lateral projection from said lever, substantially as described.

9. The combination of the following elements in a ruffling attachment: a frame comprising a bed-plate and upright, an arm or lever pivoted to said upright, a gatherer attached to a wrist or lateral projection from said arm or lever, and a separator and presser-foot, each attached to a projection from the bed-plate, substantially as described.

In testimony whereof I have signed this specification in presence of two subscribing witnesses.

FREDERIC B. ZAY.

Witnesses:
R. H. HOLLYDAY,
JOS. STACKHOUS.